United States Patent
Choi et al.

(10) Patent No.: US 7,334,073 B2
(45) Date of Patent: Feb. 19, 2008

(54) METHOD OF AND APPARATUS FOR INTERFACING BUSES OPERATING AT DIFFERENT SPEEDS

(75) Inventors: Sang-ik Choi, Suwon-si (KR); Shin-wook Kang, Gyeonggi (KR); Hyang-suk Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 237 days.

(21) Appl. No.: 11/142,463

(22) Filed: Jun. 2, 2005

(65) Prior Publication Data

US 2006/0080492 A1 Apr. 13, 2006

(30) Foreign Application Priority Data

Jun. 2, 2004 (KR) .................. 10-2004-0039984

(51) Int. Cl.
*G06F 13/36* (2006.01)
(52) U.S. Cl. .................. 710/315; 709/234; 327/145; 370/402
(58) Field of Classification Search ............. 710/305, 710/306; 713/400; 709/233; 327/145; 365/233
See application file for complete search history.

(56) References Cited

U.S. PATENT DOCUMENTS

| | | | | |
|---|---|---|---|---|
| 6,064,626 A * | 5/2000 | Stevens | ............. | 365/233 |
| 6,265,885 B1 * | 7/2001 | Luo et al. | ............. | 324/719 |
| 6,366,973 B1 | 4/2002 | Lo et al. | | |
| 6,389,476 B1 * | 5/2002 | Olnowich | ............. | 709/233 |
| 6,425,071 B1 | 7/2002 | Lo et al. | | |
| 6,442,642 B1 | 8/2002 | Brooks | | |
| 6,496,517 B1 | 12/2002 | Gehman et al. | | |
| 6,571,308 B1 | 5/2003 | Reiss et al. | | |
| 6,816,979 B1 * | 11/2004 | Chen et al. | ............. | 713/400 |
| 6,829,669 B2 * | 12/2004 | Jahnke et al. | ............. | 710/306 |
| 7,061,286 B2 * | 6/2006 | Nakamura | ............. | 327/145 |
| 7,165,184 B2 * | 1/2007 | Fuks | ............. | 713/400 |
| 2002/0147868 A1 | 10/2002 | Tsai | | |
| 2004/0024943 A1 * | 2/2004 | Lupien et al. | ............. | 710/305 |

FOREIGN PATENT DOCUMENTS

| | | |
|---|---|---|
| EP | 1 187 031 A2 | 3/2002 |
| JP | 2000-276358 | 10/2000 |
| KR | 2003-0027630 | 4/2003 |
| KR | 2003-0075566 | 9/2003 |

* cited by examiner

*Primary Examiner*—Christopher E. Lee
(74) *Attorney, Agent, or Firm*—Staas & Halsey LLP

(57) ABSTRACT

The present invention relates to a bridge for interfacing buses within an embedded system. There is provided a method of interfacing a first bus and a second bus operating at different speeds, the method includes counting a match value assigned to a predetermined peripheral device among peripheral devices connected to the second bus for each cycle of a clock signal received from the first bus, and keeping a read state or a write state for the predetermined peripheral device by continuously outputting a read signal or a write signal for the predetermined peripheral device to the second bus, during the counting of the match value. According to the present invention, it is not necessary to operate depending on a peripheral device operating at the lowest speed among peripheral devices, and not necessary to add wrappers to the peripheral devices, by employing the AHB-to-ISA bridge variably adjusting the output times of output signals to an ISA bus.

18 Claims, 8 Drawing Sheets

METHOD OF AND APPARATUS FOR INTERFACING BUSES OPERATING AT DIFFERENT SPEEDS

CROSS-REFERENCE TO RELATED APPLICATIONS

This application claims the benefit of Korean Patent Application No. 2004-39984, filed on Jun. 2, 2004, in the Korean Intellectual Property Office, the disclosure of which is incorporated herein by reference.

BACKGROUND OF THE INVENTION

1. Field of the Invention

The present invention relates to an embedded system, and more particularly, to a bridge for interfacing buses within the embedded system.

2. Description of the Related Art

FIG. 1 is a configuration diagram showing an embedded system conforming to a conventional Advanced Microcontroller Bus Architecture (AMBA) standard.

The embedded system conforming to the conventional AMBA comprises an AHB (Advanced High-Performance Bus)-to-APB (Advanced Peripheral Bus) bridge 1, an AHB 2, an APB 3, a central processing unit (CPU) 11, an AHB master_1 12, an AHB master_2 13, an AHB master_3 14, an AHB slave_1 15, an AHB slave_2 16, a light emitting diode (LED) 17, a local area network (LAN) 18, and a universal asynchronous receiver/transmitter (UART) 19.

AMBA refers to a standard for an on-chip bus, which is provided by ARM (Advanced RISC Machines) Ltd., and is widely used in an embedded system owing to the simple structure and the low power consumption. Since various peripheral devices connected to outside of a chip conforming to the AMBA standard operate at speeds lower than the clock speed of the CPU 11, the AMBA standard has two bus layers, which are the AHB 2 and the APB 3. The CPU 11 and the devices 12, 13, 14, 15, and 16 operating at the clock speed of the CPU 11 are connected to the AHB. The peripheral devices 17, 18, and 19 operating at speeds lower than the clock speed of the CPU 11 are connected to the APB 3. FIG. 1 illustrates the LED 17, the LAN 18, and the UART 19 as the peripheral devices 17, 18, and 19.

The AHB-to-APB bridge 1 is located between the AHB 2 and the APB 3, and interfaces the AHB 2 and the APB 3 operating at different speeds. If the CPU 11 transmits a certain signal to any one of the peripheral devices 17, 18, and 19, e.g., the UART 19, without the AHB-to-APB bridge 1, the signal transmitted from the CPU 11 will disappear before the UART 19 reads the signal because of a mismatch of operating timings.

The peripheral devices 17, 18, and 19 that are connected to the APB 3 operate at various speeds.

According to the conventional AMBA standard, the APB 3 should operate depending on the peripheral device operating at the lowest speed among the peripheral devices 17, 18, and 19, or a wrapper, which serves as a speed compensation circuit, should be added to each of the peripheral devices 17, 18, and 19, as shown in FIG. 1, while the APB 3 remains the same speed.

For instance, in an embedded system equipped with the AHB-to-APB bridge 1 designed under the assumption that the AHB 2 operates at 100 MHz and the APB 3 operates at 20 MHz, there may occur a case where the LAN 18 and the UART 19 operate at 20 MHz but the LED 17 operates at a speed lower than 20 MHz. In this case, the APB 3 should operate at a speed lower than 20 MHz to match the speed of the LED 17, or a wrapper, a speed compensation circuit, should be added to the LED 17.

There is a problem in that operating the APB 3 depending on a peripheral device operating at the lowest speed among the peripheral devices 17, 18, and 19 significantly degrades the overall processing speed of the embedded system, i.e., the performance of the embedded system. In addition, there is a problem in that adding a wrapper, a speed compensation circuit, to each of the peripheral devices 17, 18, and 19 results in the performance degradation, power consumption increase, or resource waste.

SUMMARY OF THE INVENTION

Additional aspects and/or advantages of the invention will be set forth in part in the description which follows and, in part, will be apparent from the description, or may be learned by practice of the invention.

The present invention provides an apparatus and a method whereby the operation does not depend on a peripheral device operating at the lowest speed among peripheral devices, and it is not necessary to add wrappers to the peripheral devices.

According to an aspect of the present invention, there is provided a method of interfacing a first bus and a second bus operating at different speeds, including counting a match value assigned to a predetermined peripheral device among peripheral devices connected to the second bus for each cycle of a clock signal received from the first bus, and keeping a read state or a write state for the predetermined peripheral device by continuously outputting a read signal or a write signal for the predetermined peripheral device to the second bus, during the counting of a match value.

Another aspect of the present invention is achieved by providing a bridge for interfacing a first bus and a second bus operating at different speeds, including a counter counting a match value assigned to a predetermined peripheral device among peripheral devices connected to the second bus for each cycle of a clock signal received from the first bus, and a finite state machine keeping a read state or a write state for the predetermined peripheral device by continuously outputting a read signal or a write signal for the predetermined peripheral device to the second bus, while the counter counts a match value.

According to another aspect of the present invention, there is provided an embedded system including a CPU, a first bus operating at a clock speed of the CPU, a second bus operating at a speed lower than the clock speed, peripheral devices connected to the second bus, and a bridge variably adjusting output times of output signals to the second bus on the basis of input signals from the first bus so as to match with operating timings of each of the peripheral devices.

According to another aspect of the present invention, there is provided a computer-readable recording medium having recorded thereon a program executing on a computer the method of interfacing a first bus and a second bus operating at different speeds.

According to another aspect of the present invention, there is provided a method of interfacing a first bus and a second bus operating at different speeds, including counting a match value assigned to a predetermined peripheral device among peripheral devices connected to the second bus for each cycle of a clock signal received from the first bus, storing match values assigned to each of the peripheral devices, and wherein the counting of a match value counts a match value assigned to the predetermined peripheral device among the stored match values.

According to another aspect of the present invention, there is provided a bridge for interfacing a first bus and a second bus operating at different speeds, including a counter counting a match value assigned to a predetermined peripheral device among peripheral devices connected to the second bus for each cycle of a clock signal received from the first bus, a match value storage unit storing match values assigned to each of the peripheral devices, and wherein the counter reads a match value assigned to the predetermined peripheral device among the match values stored in the match value storage unit.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
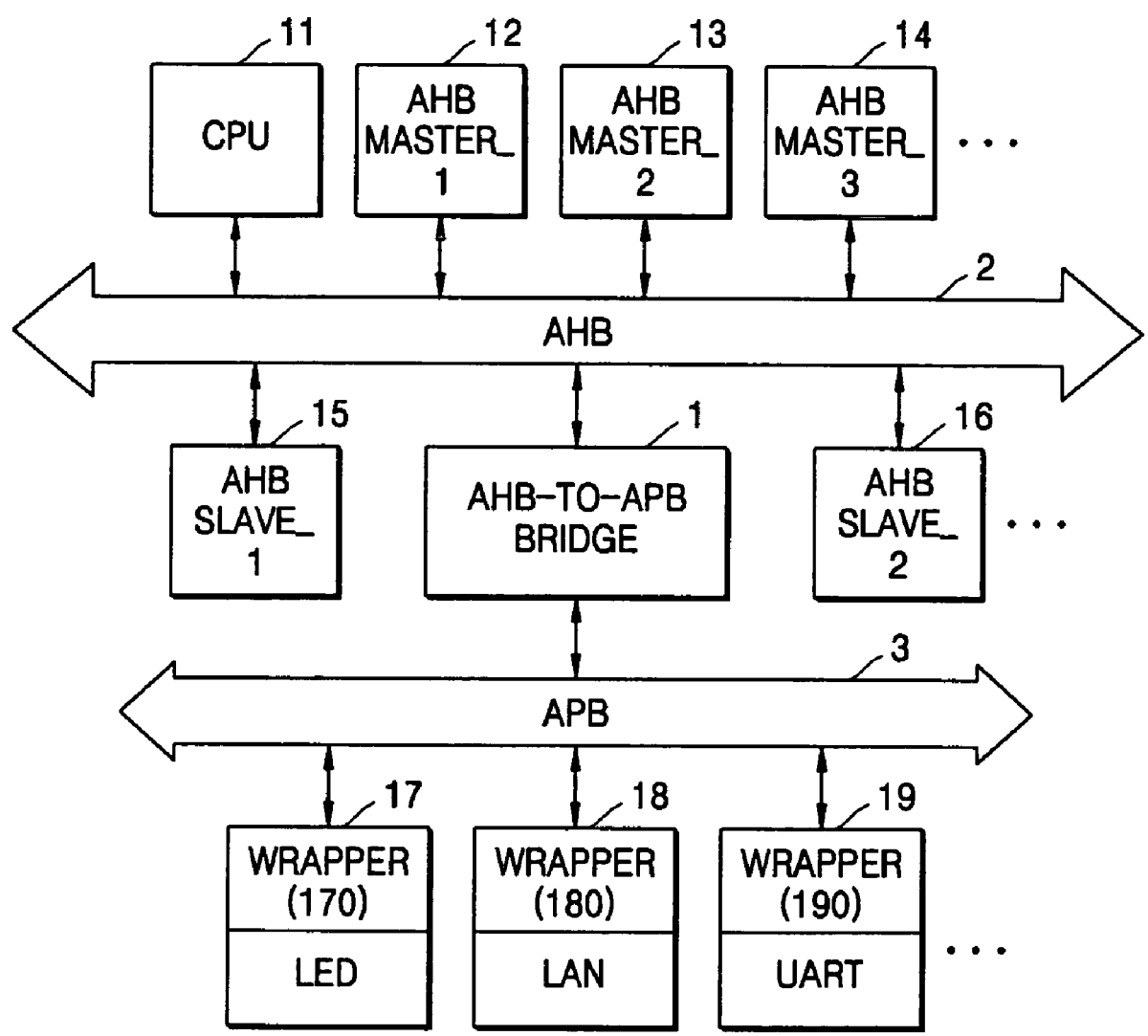
FIG. 1 is a configuration diagram illustrating an embedded system conforming to the conventional AMBA standard.

Reference will now be made in detail to the embodiments of the present invention, examples of which are illustrated in the accompanying drawings, wherein like reference numerals refer to the like elements throughout. The embodiments are described below to explain the present invention by referring to the figures.

Exemplary embodiments according to the present invention will now be described in detail with reference to the accompanying drawings.

Figure 2:
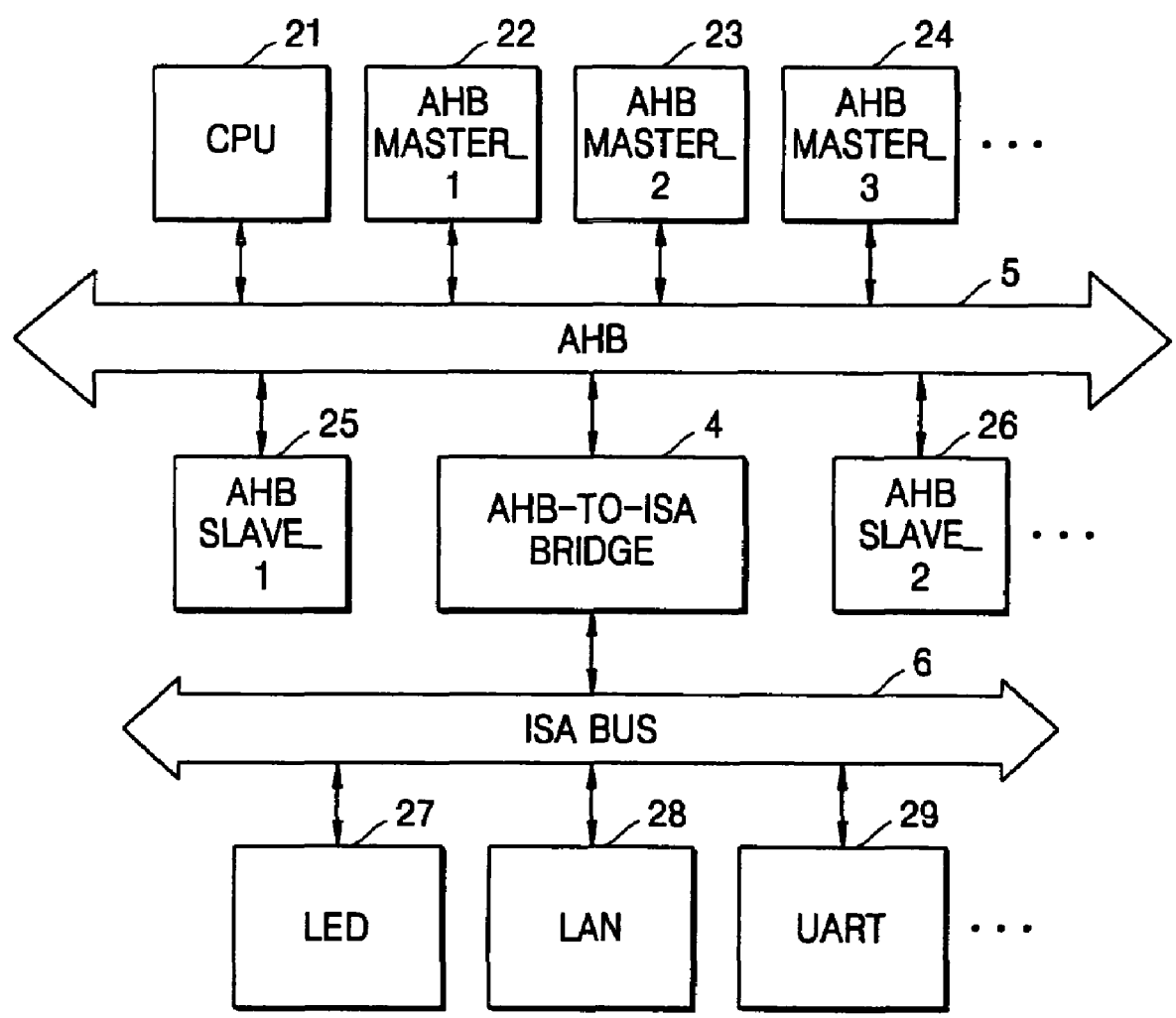
FIG. 2 is a configuration diagram illustrating an embedded system according to an embodiment of the present invention.

FIG. 2 is a configuration diagram illustrating an embedded system according to an embodiment of the present invention.

The embedded system according to the present embodiment comprises an AHB-to-ISA (Industry Standard Architecture) bridge 4, an AHB 5, an ISA bus 6, a CPU 21, an AHB master_1 22, an AHB master_2 23, and AHB master_3 24, an AHB slave_1 25, an AHB slave_2 26, and an LED 27, a LAN 28, and a UART 29.

The embedded system according to the present embodiment employs the ISA bus 6, the most universal bus standard, instead of the APB 3 shown in FIG. 1. In addition, in the embedded system according to the present embodiment, a single AHB-to-ISA bridge 4 is substituted for both the AHB-to-APB bridge 1 and the wrappers 170, 180, and 190 added to the peripheral devices 17, 18, and 19, which are shown in FIG. 1.

As described above, the AHB 5 is a bus operating at the clock speed of the CPU 21. In other words, the AHB 5 is a bus operating in the same high-frequency bandwidth as the clock of the CPU 21. The CPU 21, the AHB masters 22, 23, and 24, the AHB slaves 25 and 26, and the AHB-to-ISA bridge 4, which are operating in the same high-frequency bandwidth as the AHB 5, are connected to the AHB 5.

The ISA bus 6 is a bus operating at lower speeds than the clock speed of the CPU 21. In other words, the ISA bus 6 is a bus operating in a frequency bandwidth lower than the clock of the CPU 21. The AHB-to-ISA bridge 4 and the peripheral devices 27, 28, and 29, which are operating in the same low-frequency bandwidth as the ISA bus 6, are connected to the ISA bus 6. The peripheral devices 27, 28, and 29 operate at various speeds. While the present embodiment has illustrated the LED 27, the LAN 28, and the UART 29 as the peripheral devices, any peripheral devices can be employed in the present invention.

The AHB-to-ISA bridge 4, which is a slave of the AHB 5 and a master of the ISA bus 6, interfaces the AHB 5 and the ISA bus 6, which are operating at different speeds.

Figure 3:
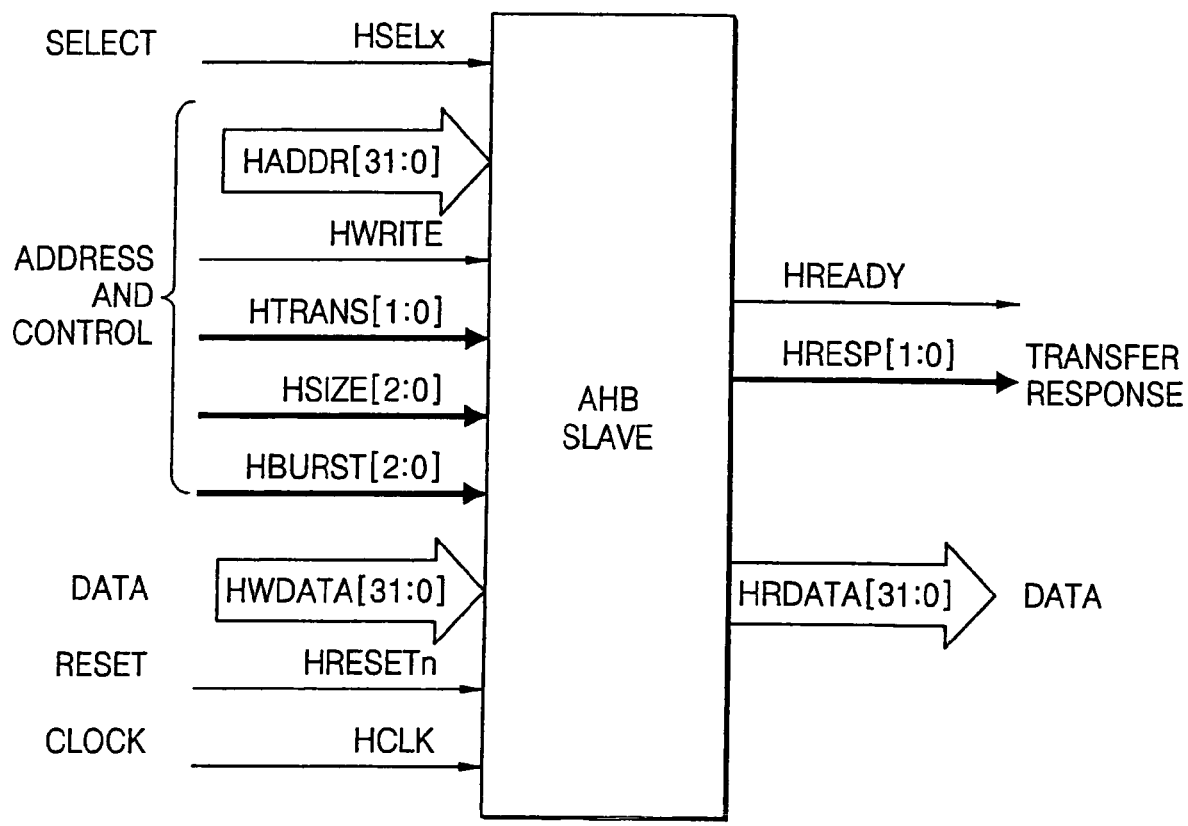
FIG. 3 illustrates input/output signals of an AHB slave.

FIG. 3 illustrates input/output signals of an AHB slave.

The input/output signals illustrated in FIG. 3 are the ones conforming to the AMBA standard. The AHB-to-ISA bridge 4 illustrated in FIG. 2 corresponds to a slave of the AHB 5, and thus receives the same as the input signals shown in FIG. 3.

Figure 4:
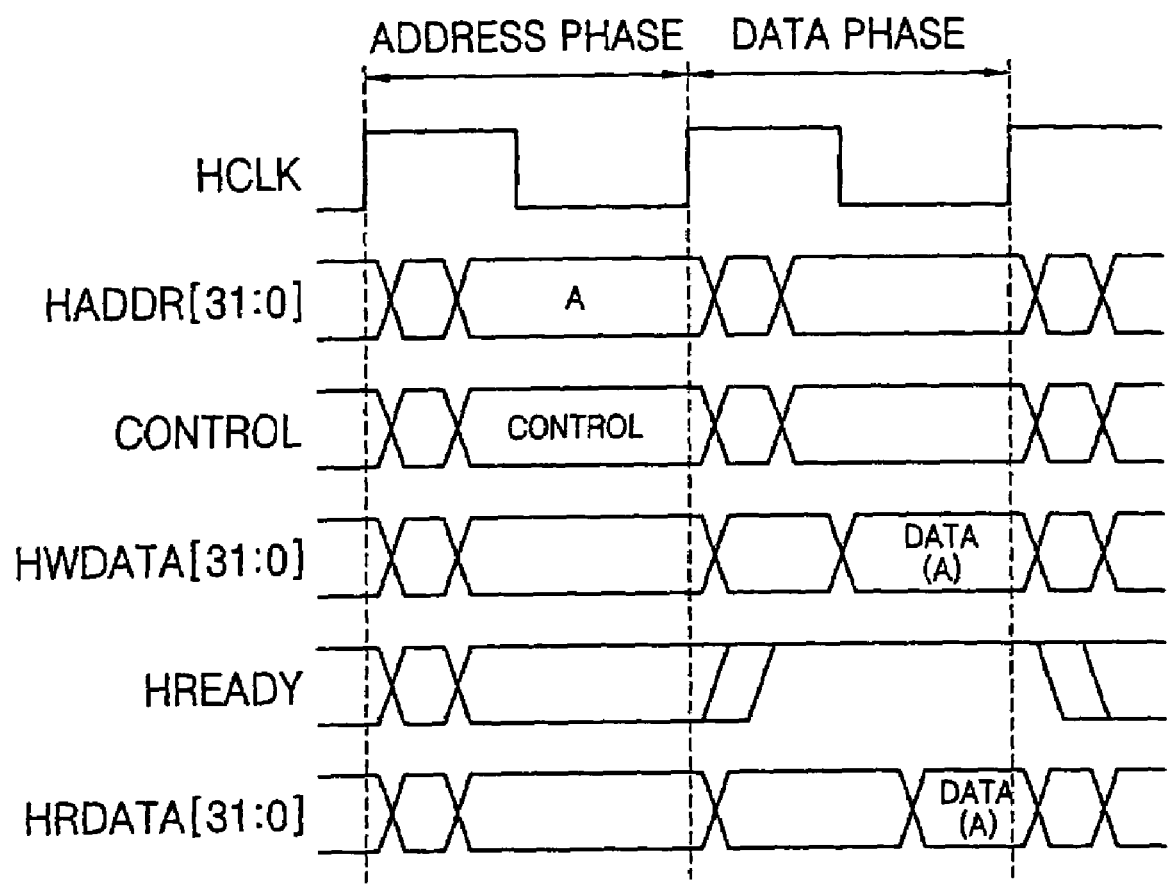
FIG. 4 is a timing chart illustrating the timings of input/output signals of an AHB slave.

FIG. 4 is a timing chart illustrating the timings of the input/output signals of the AHB slave.

A transfer in the AHB slave is completed in 2 cycles, which is divided into an address phase and a data phase. The AHB-to-ISA bridge 4 corresponds to a slave of the AHB 5, and thus operates in accordance with the same as the timings of the input signals shown in FIG. 4. Meanwhile, the AHB-to-ISA bridge 4 is a slave of the AHB 5 and a master of the ISA bus 6, and thus should output signals which match the operating timings of the peripheral devices 27, 28, and 29 connected to the ISA bus 6.

In order to solve such an interfacing problem, the AHB-to-ISA bridge 4 variably adjusts output times of output signals to the ISA bus 6 on the basis of input signals from the AHB 5 so as to match the operating timing of each of the peripheral devices 27, 28, and 29 connected to the ISA bus 6. More specifically, the AHB-to-ISA bridge 4 generates the output signals to the ISA bus 6 by combining or separating the input signals from the AHB 5 so as to comply with the ISA bus standard, and converts the signals of the AHB 5 protocol to the signals of the ISA bus 6 protocol by variably adjusting the output times of the output signals. That is, the AHB-to-ISA bridge 4 can be referred to as a protocol converter for converting the signals of the AHB 5 protocol to the signals of the ISA bus 6 protocol, and also a speed compensation controller for variably adjusting the output times of output signals.

Figure 5:
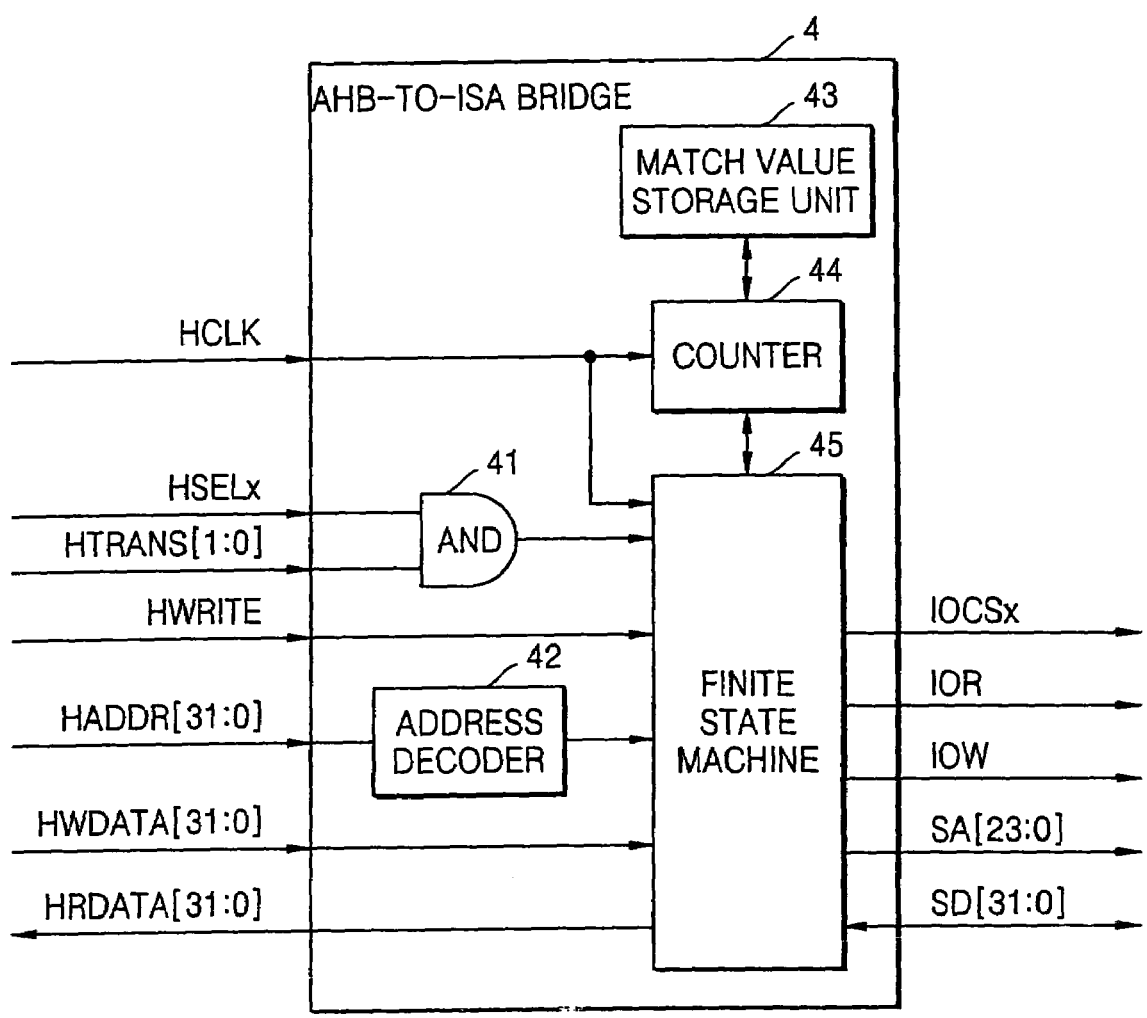
FIG. 5 is a configuration diagram illustrating the AHB-to-ISA bridge 4 shown in FIG. 2.

FIG. 5 is a configuration diagram illustrating the AHB-to-ISA bridge 4 shown in FIG. 2.

The AHB-to-ISA bridge 4 comprises an AND gate 41, an address decoder 42, a finite state machine 45, a counter 44, and a match value storage unit 43.

The AND gate 41 performs an AND operation on HSELx and HTRANS[1:0], which are control signals received from the AHB 5, and outputs the result of the AND operation to the finite state machine 45. HSELx indicates which slave is the destination of a current transfer in the AHB 5. If the destination of a current transfer in the AHB 5 is the AHB-to-ISA bridge 4, HSELx input to the AHB-to-ISA bridge 4 changes from 0 to 1. HTRANS[1:0] indicates the types of the current transfer such as non-sequential, sequential, idle, and busy. In the present embodiment, a change of HSELx from 0 to 1 and a change of HTRANS[1:0] from 00 or 01 to 10 or 11, i.e., a change of a value output from the AND gate 41 from 0 to 1 indicates a transfer from the AHB 5 to AHB-to-ISA bridge 4.

The address decoder 42 decodes HADDR[31:0], which is an address signal received from the AHB 5. According to the present embodiment, addresses from A0000000 to AFFFFFFF in HADDR[31:0] are assigned to the peripheral devices 27, 28, and 29, and addresses from 8000XXXX to 8000FFFF are assigned to the match value storage unit 43.

The match value storage unit 43 stores match values assigned to each of the peripheral devices 27, 28, and 29. The match value storage unit 43 is typically made up of a memory device such as a register.

The counter 44 reads a match value assigned to a peripheral device, which is a current target device of the AHB 5, among the match values stored in the match value storage unit 43 on the basis of the result decoded in the address decoder 42, and counts the read match value for each cycle of a clock signal HCLK received from the AHB 5. As described above, since addresses from A0000000 to AFFFFFFF in HADDR[31:0] are assigned to the peripheral devices 27, 28, and 29, the finite state machine 45 can identify a current target peripheral device of the AHB 5 among the peripheral devices 27, 28, and 29 by referring to the result decoded in the address decoder 42, and instructing the counter 44 to read a match value assigned to the target peripheral device.

Figure 6:
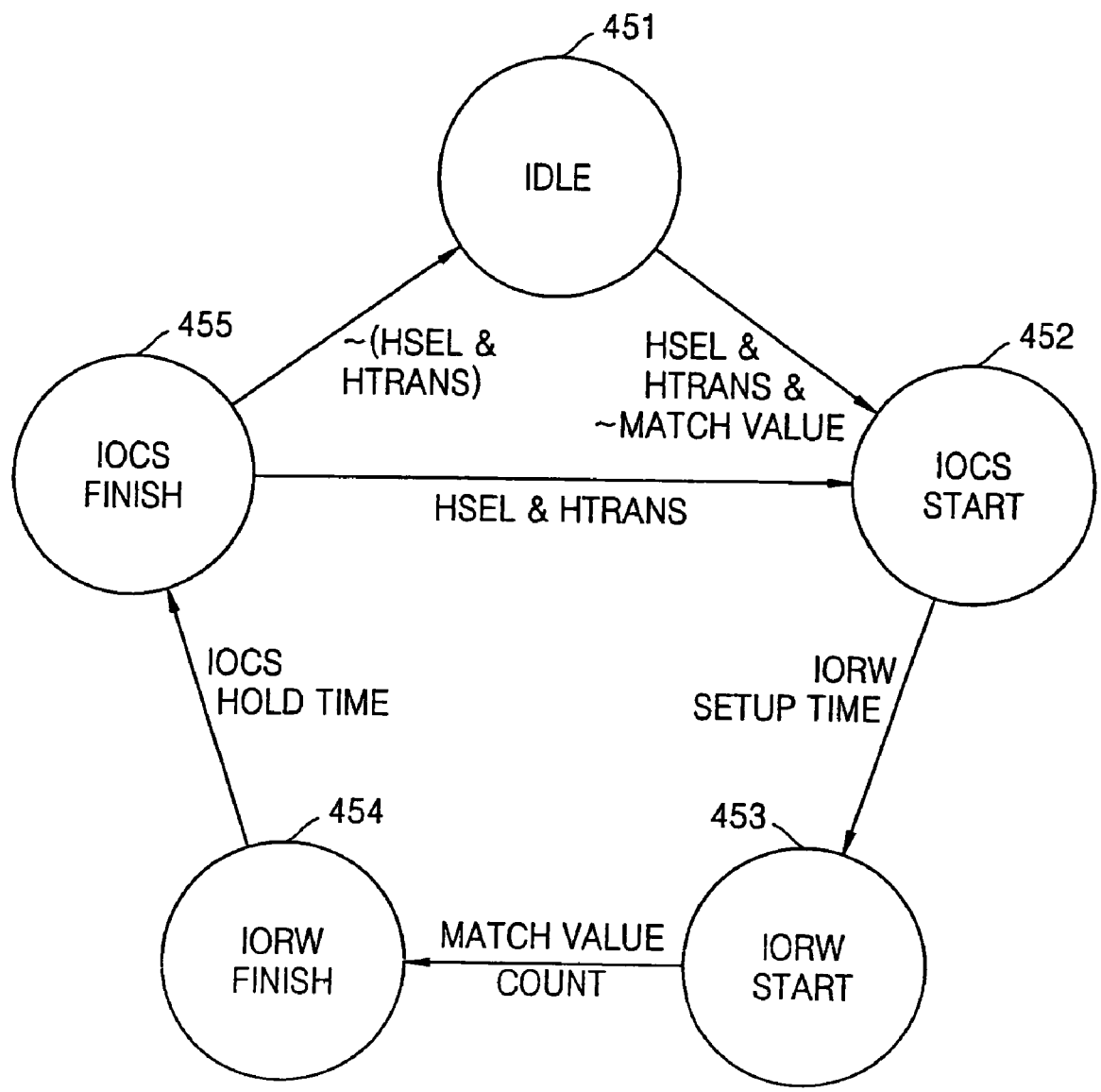
FIG. 6 illustrates states in a finite state machine shown in FIG. 5.

FIG. 6 illustrates the states in the finite state machine 45 shown in FIG. 5.

The finite state machine 45 has five states, which are an idle state 451, an IOCS (Input Output Chip Select) start state 452, an IORW (Input Output Read Write) start state 453, an IORW finish state 454, and an IOCS finish state 455. The finite state machine 45 operates according to a clock signal HCLK received from the AHB 5.

The finite state machine 45 outputs a match value output from the CPU 21 connected to the AHB 5 through the counter 44 to the match value storage unit 43 during the idle state 451. At this time, the match value storage unit 43 stores the match value received from the finite state machine 45. As described above, since addresses from 8000XXXX to 8000FFFF in HADDR[31:0] are assigned to the match value storage unit 43, the finite state machine 45 can identify whether HWDATA[31:0] to be received from the AHB 5 is a match value or data by referring to the result decoded in the address decoder 42, and outputs HWDATA[31:0] received from the AHB 5 through the counter 44 to the match value storage unit 43. Accordingly, the CPU 21 can control the match value in a software manner.

If the control signals HSELx and HTRANS[1:0] received from the AHB 5 indicate a transfer to the AHB-to-ISA bridge 4 and HWDATA[31:0] to be received from the AHB 5 is data, i.e., a signal received from the AND gate 41 changes from 0 to 1 and HADDR[31:0] is any one of 8000XXXX to 8000FFFF, the finite state machine 45 transits from the idle state 451 to the IOCS start state 452, which is a select start state for a current target peripheral device of the AHB 5. The finite state machine 45 outputs a signal for selecting a current target peripheral device of the AHB 5, i.e., a control signal IOCSx having a value indicating that the target peripheral device is selected, to the ISA bus 6 during the IOCS start state 452 through the IOCS finish state 455. That is, the finite state machine 45 changes IOCSx from 1 to 0, which is outputted to a current target peripheral device of the AHB 5.

After an IORW setup time which is a time required for setting the IORW start state 453, a read/write state for a current target peripheral device of the AHB 5, the finite state machine 45 transits from the IOCS start state 452 to the IORW start state 453. The IORW setup time is typically about 1 clock.

Subsequently, while the counter 44 counts, the finite state machine 45 separates a single read/write signal HWRITE received from the AHB 5 and continuously outputs read/write signals for a current target peripheral device of the AHB 5, i.e., an IOW (Input Output Write) or an IOR (Input Output Read) signal, to the ISA bus 6, thereby keeping a read/write state for the peripheral device. HWRITE is 1 for a write state and 0 for a read state. Accordingly, IOW falls from 1 to 0 when HWRITE is 1, and IOR falls from 1 to 0 when HWRITE is 0. In this case, IOR and IOW are not changed to 0 simultaneously.

In addition, the finite state machine 45 outputs a data signal HWDATA[31:0] received from the AHB 5 to the ISA bus 6 in the form of SD[31:0] while IOW is in the "0" state, and outputs a data signal SD[31:0] received from the ISA bus 6 to the AHB 5 in the form of HRDATA[31:0] while IOR is in the "0" state. The finite state machine 45 outputs HADDR[31:0], which is received from the AHB 5, to the ISA bus 6 in the form of SA[23:0] while IOW or IOR is in the "0" state.

Next, when the counter 44 finishes counting, the finite state machine 45 transits from the IORW start state 453 to the IORW finish state 454, which is a read/write finish state for a current target peripheral device of the AHB5. That is, the finite state machine 45 outputs IOW or IOR during the IORW start state 453 through the IORW finish state 454.

Next, after an IOCS hold time which is a time required for finishing a select state for a current target peripheral device of the AHB 5, the finite state machine 45 transits from the IORW finish state 454 to the IOCS finish state 455, which is a select finish state for the peripheral device. The IOCS hold time is typically about 1 clock.

Next, the finite state machine 45 transits from the IOCS finish state 455 to the IOCS start state 452 if the control signals HSELx and HTRANS[1:0] received from the AHB 5 continuously indicate a transfer to the AHB-to-ISA bridge 4, i.e., they continuously indicate 1, and transits from the IOCS finish state 455 to the idle state 451 if HSELx and HTRANS[1:0] indicate 0.

Figure 7:
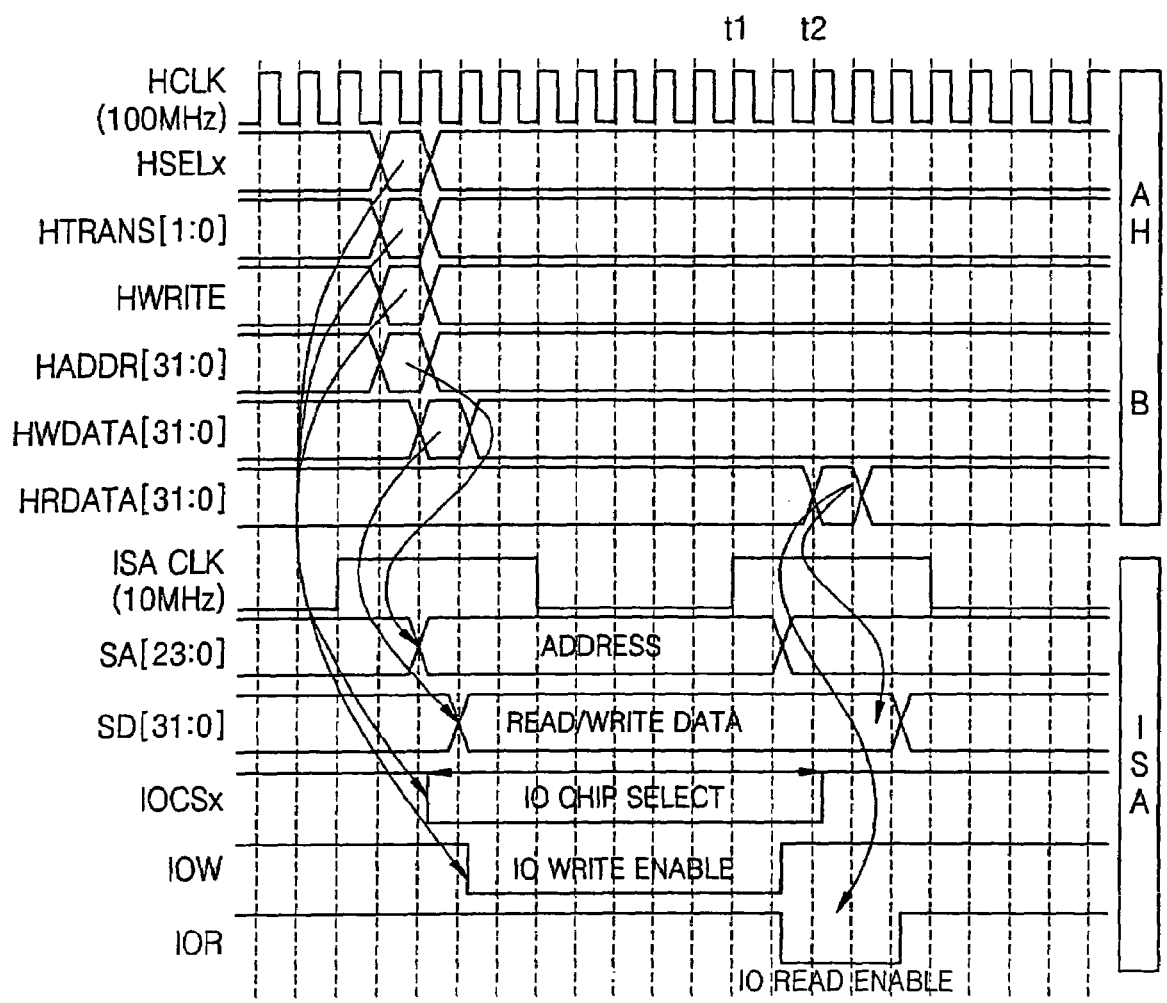
FIG. 7 is a timing chart showing the timings of input/output signals of the AHB-to-ISA bridge 4.

FIG. 7 is a timing chart illustrating the timings of the input/output signals of the AHB-to-ISA bridge 4.

The AHB 5 operates at 100 MHz and the ISA bus 6 operates at 10 MHZ, so the frequency ratio is 10:1. The AHB-to-ISA bridge 4 shown in FIG. 5 matches with the operating timings of the AHB 5 and the ISA bus 6 by increasing output times of output signals to the ISA bus 6 by 10 times compared to input times of signals received from the AHB 5. In other words, control signals, address signals, and data signals illustrated in FIG. 7 last for 10 cycles when seen from the AHB 5 side, whereas the signals last for 1 cycle when seen from the ISA bus 6 side. Accordingly, if the output times of the output signals to the ISA bus 6 are variably adjusted depending on the operating speeds of the peripheral devices 27, 28, and 29, no problem will not occur when data is read/written from/to the peripheral devices 27, 28, and 29.

Figure 8:
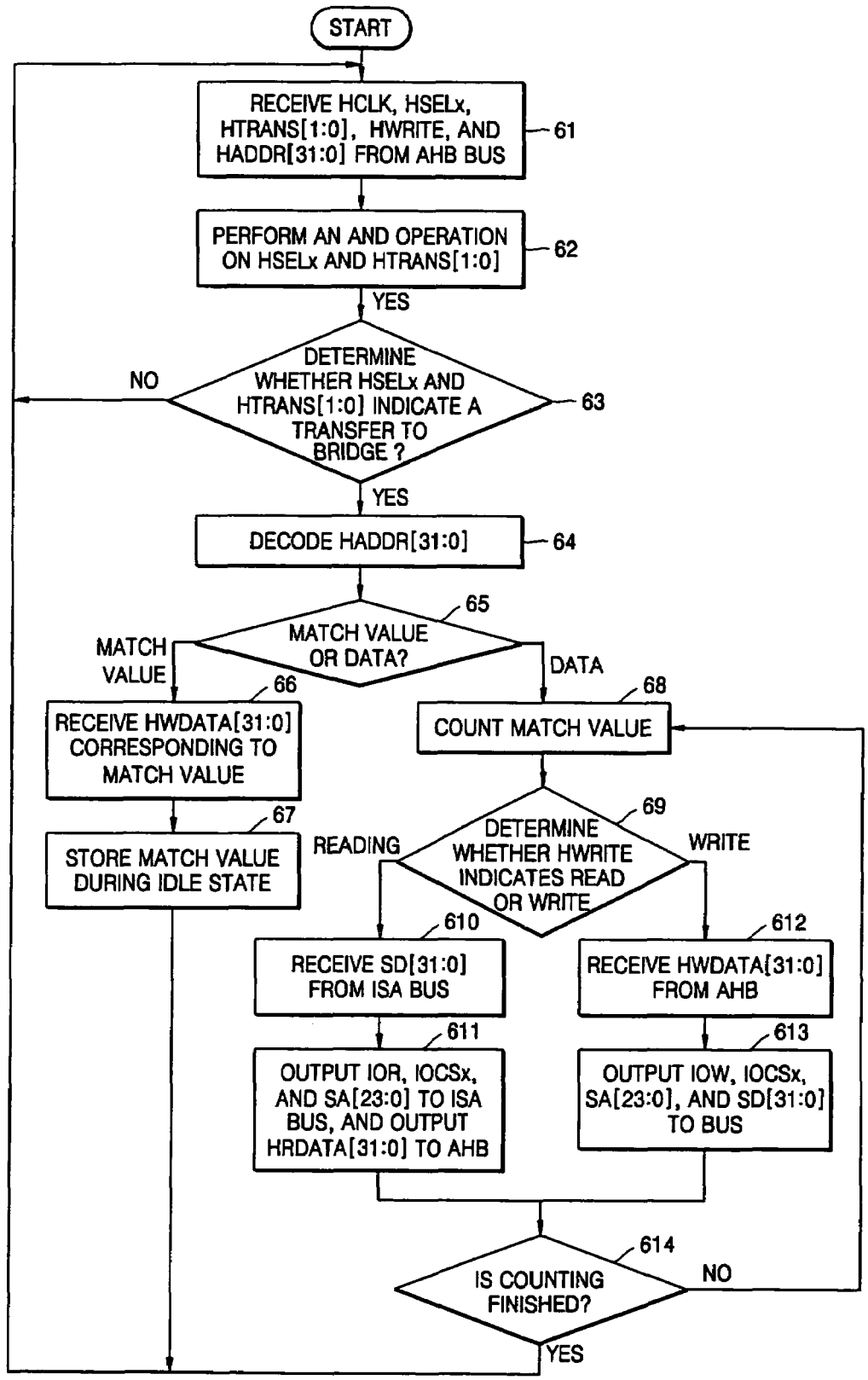
FIG. 8 is a flowchart illustrating a method of interfacing a first bus and a second bus which are operating at different speeds, according to an embodiment of the present invention.

FIG. 8 is a flowchart illustrating a method of interfacing a first bus and a second bus which are operating at different speeds, according to an embodiment of the present invention.

The interfacing method according to the present embodiment consists of the following operations. The interfacing method is implemented in the AHB-to-ISA bridge 4 illustrated in FIG. 5, and thus, the aforementioned description is also applied although omitted below.

In operation 61, the AHB-to-ISA bridge 4 receives HCLK, HSELx, HTRANS[1:0], HWRITE, and HADDR [31:0] from the AHB bus 5.

In operation 62, the AHB-to-ISA bridge 4 performs an AND operation on HSELx and HTRANS[1:0] which are input control signals in operation 61.

In operation 63, the AHB-to-ISA bridge 4 determines whether HSELx and HTRANS[1:0] indicate a transfer to AHB-to-ISA bridge 4 on the basis of the result obtained in operation 62. In the present embodiment, a change of HSELx from 0 to 1 and a change of HTRANS[1:0] from 00 or 01 to 10 or 11, i.e., a change of a value output from the AND gate 41 from 0 to 1, indicates a transfer from the AHB 5 to AHB-to-ISA bridge 4.

When HSELx and HTRANS[1:0] are determined to indicate a transfer to AHB-to-ISA bridge 4 in operation 63, the AHB-to-ISA bridge 4 decodes HADDR[31:0], which is an address signal input in operation 61, in operation 64. According to the present embodiment, addresses from A0000000 to AFFFFFFF in HADDR[31:0] are assigned to the peripheral devices 27, 28, and 29, and addresses from 8000XXXX to 8000FFFF are assigned to the match value storage unit 43.

In operation 65, the AHB-to-ISA bridge 4 determines whether HWDATA[31:0] to be received from the AHB 5 is a match value or data on the basis of the result decoded in operation 64. As described above, since addresses from 8000XXXX to 8000FFFF in HADDR[31:0] are assigned to the match value storage unit 43, the AHB-to-ISA bridge 4 can identify whether HWDATA[31:0] to be received from the AHB 5 is a match value or data by referring to the result decoded in operation 64.

When HWDATA[31:0] is determined to be a match value in operation 65, the AHB-to-ISA bridge 4 receives HWDATA[31:0], which corresponds to a match value, from the AHB bus 5 in operation 66.

In operation 67, the AHB-to-ISA bridge 4 stores the match value input in operation 66 during the idle state 451. The AHB-to-ISA bridge 4 can store match values assigned to each of the peripheral devices 27, 28, and 29 by repeating operations 61 through 67 by the number of the peripheral devices 27, 28, and 29. That is, the AHB-to-ISA bridge 4 receives and stores match values presented from the CPU 21 connected to the AHB bus 5. Accordingly, the CPU 21 can control the match values in a software manner.

When HWDATA[31:0] is determined to be data in operation 65, in operation 68, the AHB-to-ISA bridge 4 counts a match value assigned to a current target peripheral device of the AHB 5 among the match values stored in operation 67 for each cycle of a clock signal HLCK received from the AHB 5 on the basis of the result decoded in operation 64. As described above, since addresses from A0000000 to AFFFFFFF in HADDR[31:0] are assigned to the peripheral devices 27, 28, and 29, the finite state machine 45 can identify a current target peripheral device of the AHB 5 among the peripheral devices 27, 28, and 29 by referring to the result decoded in the address decoder 42.

If the control signals HSELx and HTRANS[1:0] input in operation 61 indicate a transfer to the AHB-to-ISA bridge 4 and HWDATA[31:0] is determined to be data in operation 65, the AHB-to-ISA bridge 4 transits from the idle state 451 to the IOCS start state 452, which is a select start state for a current target peripheral device of the AHB 5. The AHB-to-ISA bridge 4 transits from the IOCS start state 452 to the IORW start state 453 after an IORW setup time which is a time required for setting the IORW start state 453, a read/write state for a current target peripheral device of the AHB 5. The IORW setup time is typically about 1 clock.

In operation 69, the AHB-to-ISA bridge 4 determines whether a single read/write signal HWRITE input in operation 61 indicates a read or a write.

When HWRITE is determined to indicate a read in operation 69, the AHB-to-ISA bridge 4 receives a data signal SD[31:0] from the ISA bus 6 in operation 610.

In operation 611, while counting the match value in operation 68, the AHB-to-ISA bridge 4 separates the read/write signal HWRITE input in operation 61, and continuously outputs IOR, which is a read signal for a current target peripheral device of the AHB 5, to the ISA bus 6, thereby keeping a read state for the peripheral device. HWRITE is 1 for a write state and 0 for a read state. Accordingly, IOW falls from 1 to 0 when HWRITE is 1, and IOR falls from 1 to 0 when HWRITE is 0. The AHB-to-ISA bridge 4 outputs a data signal SD[31:0] input in operation 610 to the AHB 5 in the form of HRDATA[31:0] and outputs HADDR[31:0] input in operation 61 to the ISA bus 6 in the form of SA[23:0], while IOR is in the "0" state.

When HWRITE is determined to indicate a write in operation 69, the AHB-to-ISA bridge 4 receives a data signal HWDATA[31:0] from the AHB 5 in operation 612.

In operation 613, while counting the match value in operation 68, the AHB-to-ISA bridge 4 separates the read/write signal HWRITE input in operation 61, and continuously outputs IOW, which is a write signal for a current target peripheral device of the AHB 5, to the ISA bus 6, thereby keeping a read state for the peripheral device. In addition, the finite state machine 45 outputs a data signal HWDATA[31:0] input in operation 612 to the ISA bus 6 in the form of SD[31:0] and outputs HADDR[31:0] input in operation 61 to the ISA bus 6 in the form of SA[23:0], while IOW is in the "0" state.

In operation 614, when finishing counting in operation 65, the AHB-to-ISA bridge 4 transits from the IORW start state 453 to the IORW finish state 454, which is a read/write finish state for a current target peripheral device of the AHB 5. That is, the AHB-to-ISA bridge 4 outputs IOW or IOR during the IORW start state 453 through the IORW finish state 454. The AHB-to-ISA bridge 4 transits from the IORW finish state 454 to the IOCS finish state 455, which is a select finish state for the peripheral device, after an IOCS hold time which is a time required for finishing a select state for a current target peripheral device of the AHB 5. The IOCS hold time is typically about 1 clock. The AHB-to-ISA bridge 4 transits from the IOCS finish state 455 to the IOCS start state 452 if the control signals HSELx and HTRANS[1:0] received from the AHB 5 continuously indicate a transfer to the AHB-to-ISA bridge 4, i.e., they continuously indicate 1, and transits from the IOCS finish state 455 to the idle state 451 if HSELx and HTRANS[1:0] indicate 0.

The aforementioned embodiments can be prepared with a computer-executable program, and implemented on a universal digital computer executing the program using a computer-readable recording medium.

In addition, the data structure used in the embodiments of the present invention can be recorded on a computer-readable recording medium through various means.

Examples of the computer-readable recording medium include a magnetic storage medium, such as ROM, floppy disk, or hard disk, or an optical storage medium, such as a CDROM or a DVD.

While the present invention has been described with reference to exemplary embodiments thereof, it will be understood by those skilled in the art that various changes in form and details may be made therein without departing from the scope of the present invention as defined by the following claims.

According to the present invention, an embedded system conforming to a conventional AMBA standard has been upgraded to a more universal embedded system by employing an AHB-to-ISA bridge generating output signals complying with the ISA bus standard, the most universal bus standard, from input signals from the AHB conforming to the AMBA standard.

In addition, according to the present invention, it is not necessary to operate depending on a peripheral device operating at the lowest speed among peripheral devices, and not necessary to add wrappers to the peripheral devices, by employing the AHB-to-ISA bridge variably adjusting the output times of output signals to an ISA bus. As a result, it is possible to optimize the performance of the embedded system, and prevent the performance degradation, power consumption increase, or resource waste caused by adding the wrappers to the peripheral devices.

In addition, since a CPU can freely control match values in a software manner, it is possible to attach/detach peripheral devices operating at different speeds while keeping the embedded system in optimum performance.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of interfacing a first bus and a second bus operating at different speeds, comprising:
    counting a match value assigned to a predetermined peripheral device among peripheral devices connected to the second bus for each cycle of a clock signal received from the first bus, the first bus being an AHB (Advanced High-performance Bus) conforming to AMBA Standard and the second bus being an ISA (Industry Standard Architecture) bus; and
    keeping a read state or a write state for the predetermined peripheral device by continuously outputting a read signal or a write signal for the predetermined peripheral device to the second bus, during the counting of the match value.

2. The method of claim 1, wherein the keeping of a read state or a write state separates a single read/write signal received from the first bus and outputs a read signal or a write signal.

3. The method of claim 1, further comprising storing match values assigned to each of the peripheral devices, wherein the counting of a match value counts a match value assigned to the predetermined peripheral device among the stored match values.

4. The method of claim 3, further comprising decoding an address signal received from the first bus, wherein the counting of a match value counts a match value assigned to the predetermined peripheral device among the match values stored in the storing of match values on the basis of the decoded result.

5. The method of claim 3, wherein the storing of match values receives and stores match values presented from a CPU (Central Processing Unit) connected to the first bus.

6. The method of claim 1, wherein the keeping of a read state or a write state transits from a read start state or a write start state to a read finish state or a write finish state for the predetermined peripheral device, when counting is finished in the counting of a match value.

7. The method of claim 6,
    wherein the keeping of a read state or a write state transits from an idle state to a select start state for the predetermined peripheral device if a combination of control signals received from the AHB indicates a transfer to a bridge, and transits from the read finish state or the write finish state to a select finish state for the predetermined peripheral device.

8. The method of claim 7,
    wherein the keeping of a read state or a write state outputs a signal selecting the predetermined peripheral device to the ISA bus during the select start state through the select finish state, and outputs a signal reading or writing for the predetermined peripheral device to the ISA bus during the read start state or the write start state through the read finish state or the write finish state.

9. A bridge for interfacing a first bus and a second bus operating at different speeds, comprising:
    a counter counting a match value assigned to a predetermined peripheral device among peripheral devices connected to the second bus for each cycle of a clock signal received from the first bus; and
    a finite state machine keeping a read state or a write state for the predetermined peripheral device by continuously outputting a read signal or a write signal for the predetermined peripheral device to the second bus, while the counter counts the match value,
    wherein, the first bus is an AHB (Advanced High-performance Bus) conforming to AMBA Standard and the second bus is an ISA (Industry Standard Architecture) bus.

10. The bridge of claim 9, wherein the finite state machine separates a single read/write signal received from the first bus and outputs a read signal or a write signal.

11. The bridge of claim 9, further comprising a match value storage unit storing match values assigned to each of the peripheral devices, wherein the counter reads a match value assigned to the predetermined peripheral device among the match values stored in the match value storage unit.

12. The bridge of claim 11, further comprising an address decoder decoding an address signal received from the first bus, wherein the counter reads a match value assigned to the predetermined peripheral device among the match values stored in the match value storage unit on the basis of the result decoded in the address decoder.

13. The bridge of claim 11, wherein the finite state machine outputs match values presented from a CPU connected to the first bus to the match value storage unit, and the match value storage unit stores the match values received from the finite state machine.

14. An embedded system comprising:
    a CPU;
    a first bus which is an AHB (Advanced High-performance Bus) conforming to AMBA Standard, operating at a clock speed of the CPU;

a second bus which is an ISA (Industry Standard Architecture) bus, operating at a speed lower than the clock speed;

peripheral devices connected to the second bus; and a bridge variably adjusting output times of output signals to the second bus on the basis of input signals from the first bus so as to match with operating timings of each of the peripheral devices.

15. The embedded system of claim 14, wherein the bridge generates the output signals by combining or separating the input signals, and converts signals of the first bus protocol to signals of the second bus protocol by variably adjusting the output times of the generated output signals.

16. A computer-readable recording medium implementing a method of interfacing a first bus and a second bus operating at different speeds to be performed by a computer, the method comprising:

counting a match value assigned to a predetermined peripheral device among peripheral devices connected to the second bus for each cycle of a clock signal received from the first bus, the first bus being an AHB (Advanced High-performance Bus) conforming to AMBA Standard and the second bus being an ISA (Industry Standard Architecture) bus; and keeping a read state or a write state for the predetermined peripheral device by continuously outputting a read signal or a write signal for the predetermined peripheral device to the second bus, during the counting of the match value.

17. A method of interfacing a first bus and a second bus operating at different speeds, comprising:

counting a match value assigned to a predetermined peripheral device among peripheral devices connected to the second bus for each cycle of a clock signal received from the first bus, the first bus being an AHB (Advanced High-performance Bus) conforming to AMBA Standard and the second bus being an ISA (Industry Standard Architecture) bus; and storing match values assigned to each of the peripheral devices, wherein the counting of a match value counts a match value assigned to the predetermined peripheral device among the stored match values.

18. A bridge for interfacing a first bus and a second bus operating at different speeds, comprising:

a counter counting a match value assigned to a predetermined peripheral device among peripheral devices connected to the second bus for each cycle of a clock signal received from the first bus; and a match value storage unit storing match values assigned to each of the peripheral devices, wherein the counter reads a match value assigned to the predetermined peripheral device among the match values stored in the match value storage unit, wherein the first bus is an AHB (Advanced High-performance Bus) conforming to AMBA Standard and the second bus is an ISA (Industry Standard Architecture) bus.

* * * * *